United States Patent Office 2,701,632
Patented Feb. 8, 1955

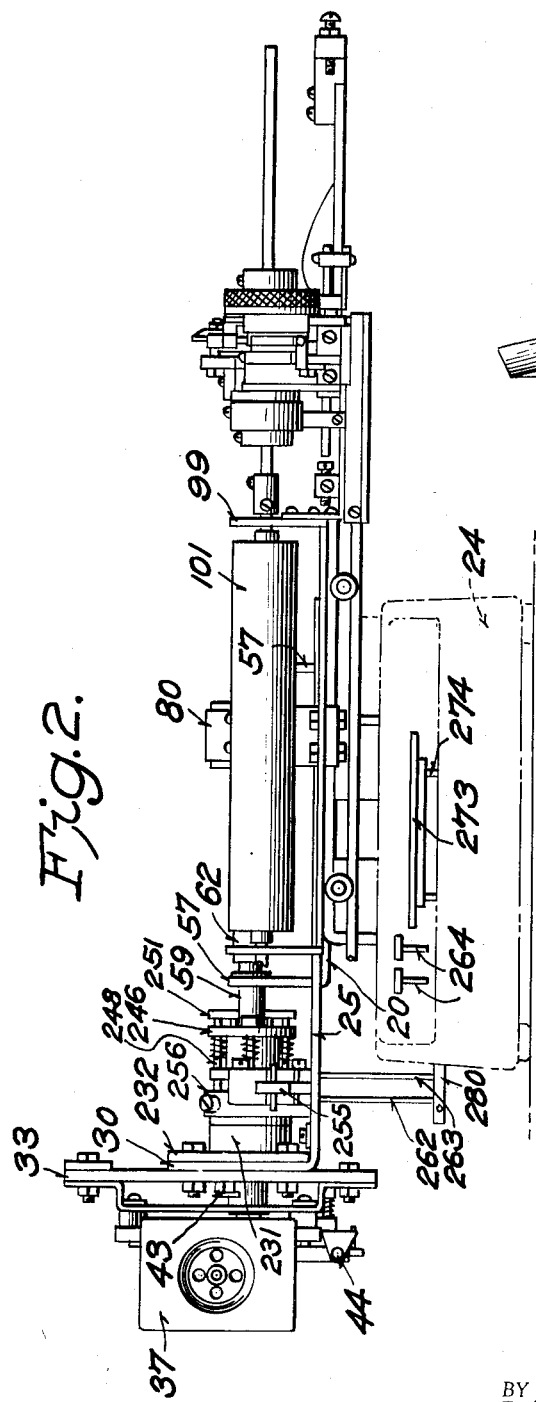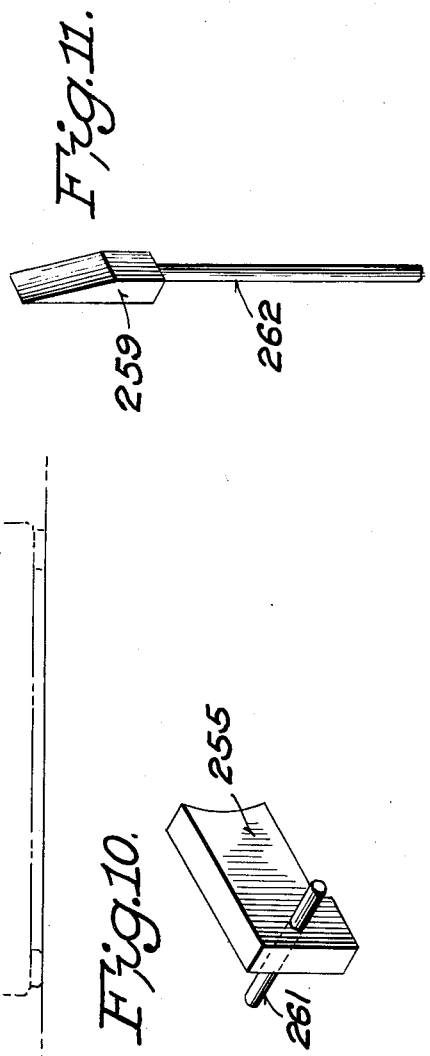
Fig. 2. Fig. 10. Fig. 11.
INVENTOR
GEORGE ZINT,
BY H. B. Wellson & Co.
ATTORNEY

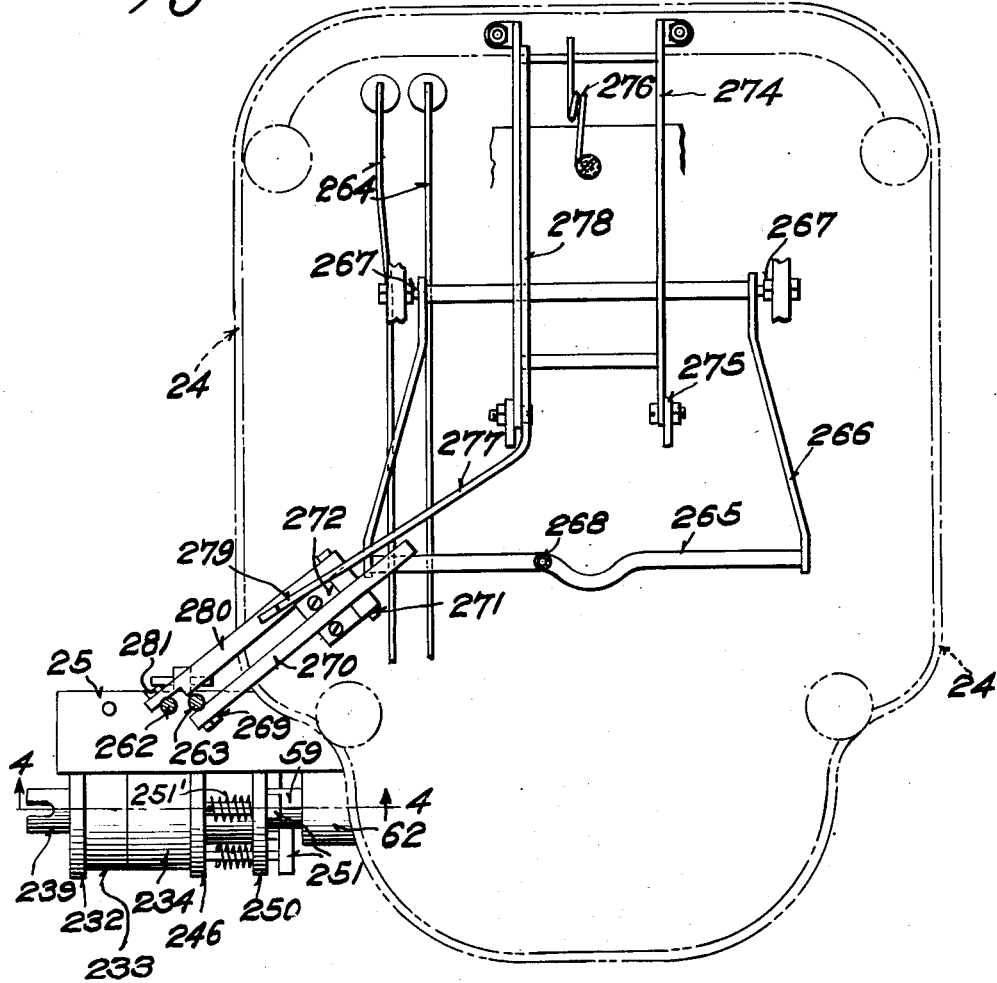

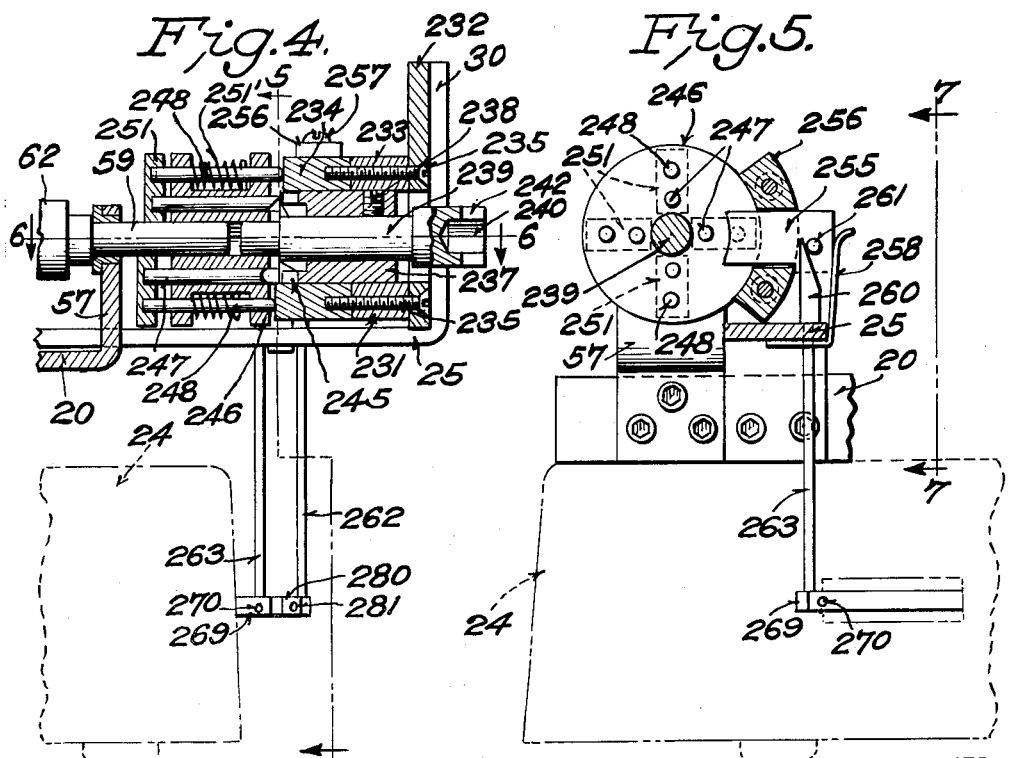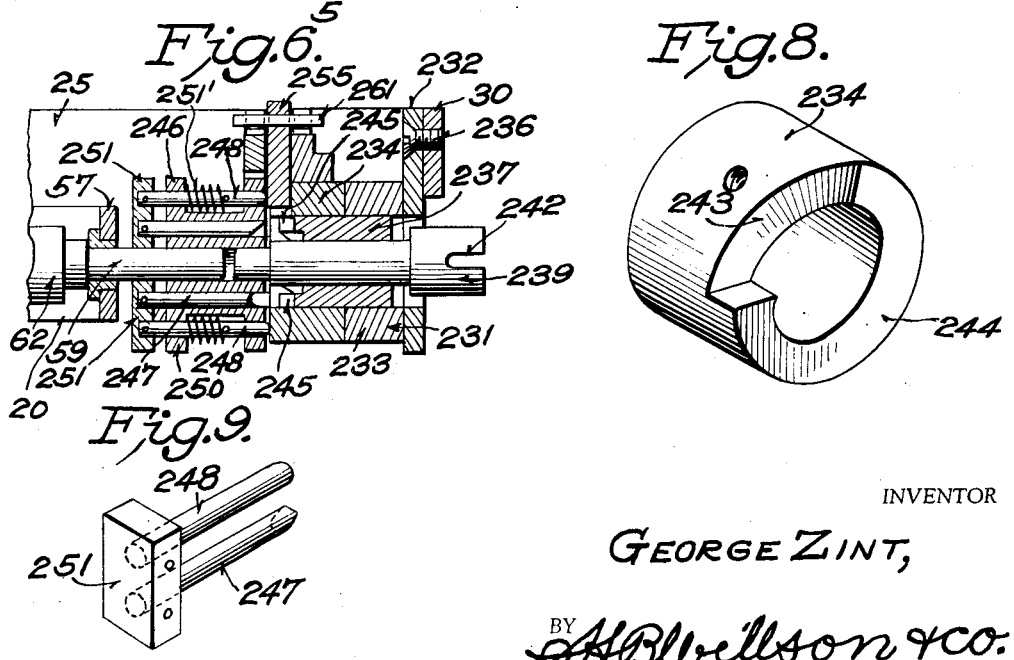

2,701,632

VARIABLE SPACING FEED MECHANISM FOR TYPEWRITERS AND OTHER MACHINES

George Zint, Wapakoneta, Ohio

Application August 5, 1953, Serial No. 372,569

7 Claims. (Cl. 197—84)

This invention is a spacing mechanism in which the motion of a power driven shaft continuously rotated in one direction may be converted into manually-controlled intermittent unidirectional motion for variable spacing purposes; and the embodiment of the invention therein disclosed is for controlling the feed mechanism of a typewriter or other machine.

The invention is especially useful in the typewriter of my Patent No. 2,578,771 December 18, 1951 in which the writing was done continuously in opposite directions. In the machine of that patent the platen carriage was continuously reciprocated at a constant speed in opposite directions, the rotary platen was automatically turned for line spacing at each end of each reciprocation of the carriage, and an audible intermittent signal was given to indicate the speed of the carriage so that the operator determined the spacing between the letters of a word and between words and sentences by the time intervals between the striking of the keys. The typewriter disclosed herein is the same as that of the patent except that the audible signaling means has been discarded and there is an intermittent feed of the carriage controlled by the manner in which the keys and the space bar are operated for spacing purposes.

The invention contemplates a continuously rotating drive shaft carrying at least one tooth adapted to pick up and move any one of an annular series of pins axially slidable in an annular head concentric with the axis of the drive shaft and fixed to a screw or other element to be driven, the head also carrying a similar annular series of slidable spring-projected plungers to which the pins are fastened, the sliding movement of the plungers, and hence their pins, being controlled in part by a stationary cam concentric with the driven shaft and having a low portion which permits one pin at a time to be projected into the path of the drive tooth to drive the screw or driven element through a portion of a revolution of the head and a high portion which retracts the pins successively and holds them retracted during the remainder of the revolution, there being provided adjacent the low portion of the cam a radially slidable gate which is spring projected into the path of sliding movement of the plungers to prevent the one approaching the low portion of the cam from being projected and thus holding the pin of that plunger out of the path of the drive tooth so that the head, and hence the screw, will cease to be driven when the previous pin is retracted from engagement with the drive tooth by the high portion of the cam, there being also provided manually operated means for retracting the gate so that the intermittent unidirectional motion imparted to the screw or driven element by the continuously rotated drive shaft may be controlled. When the invention is used in a typewriter of the above stated character, the means for retracting the control gate may be operated by any key or by the space bar so that each time one of these elements is depressed and released the carriage will be moved one space, and if either element is held depressed, the carriage will continue to move until the element is released, thus producing spaces as long as desired between letters, words and sentences.

The object of the invention is to provide a simple and practical spacing mechanism of the above indicated character which is especially useful in typewriters and similar machines.

The invention resides in the combinations of elements, arrangements of parts and features of construction, all as will be more fully pointed out hereinafter, and disclosed in the accompanying drawings in which the present preferred embodiment of the invention is illustrated.

In the drawings:

Fig. 2 is a front elevation of most of the machine shown in Fig. 1;

Fig. 3 is a somewhat diagrammatic bottom plan view of parts of the machine to show how the typewriter keys and the space bar operate the slidable cams or wedges associated with the control gate;

Fig. 4 is a detail vertical sectional view, slightly enlarged, taken substantially on the line 4—4 in Fig. 3 looking in the direction of the arrow;

Fig. 5 is a detail vertical section taken on the line 5—5 in Fig. 4;

Fig. 6 is a detail horizontal section taken on the line 6—6 in Fig. 4;

Fig. 7 is a detail elevational view looking in the direction of the arrows on line 7—7 in Fig. 5;

Fig. 8 is a perspective of the stationary cam member with which the pin-actuating plungers coact;

Fig. 9 is a perspective view of one of the plungers and its pin;

Fig. 10 is a perspective view of the slidable control member or gate; and

Fig. 11 is a perspective view of one of the sliding cam or wedge elements for retracting the gate.

Figure 1:
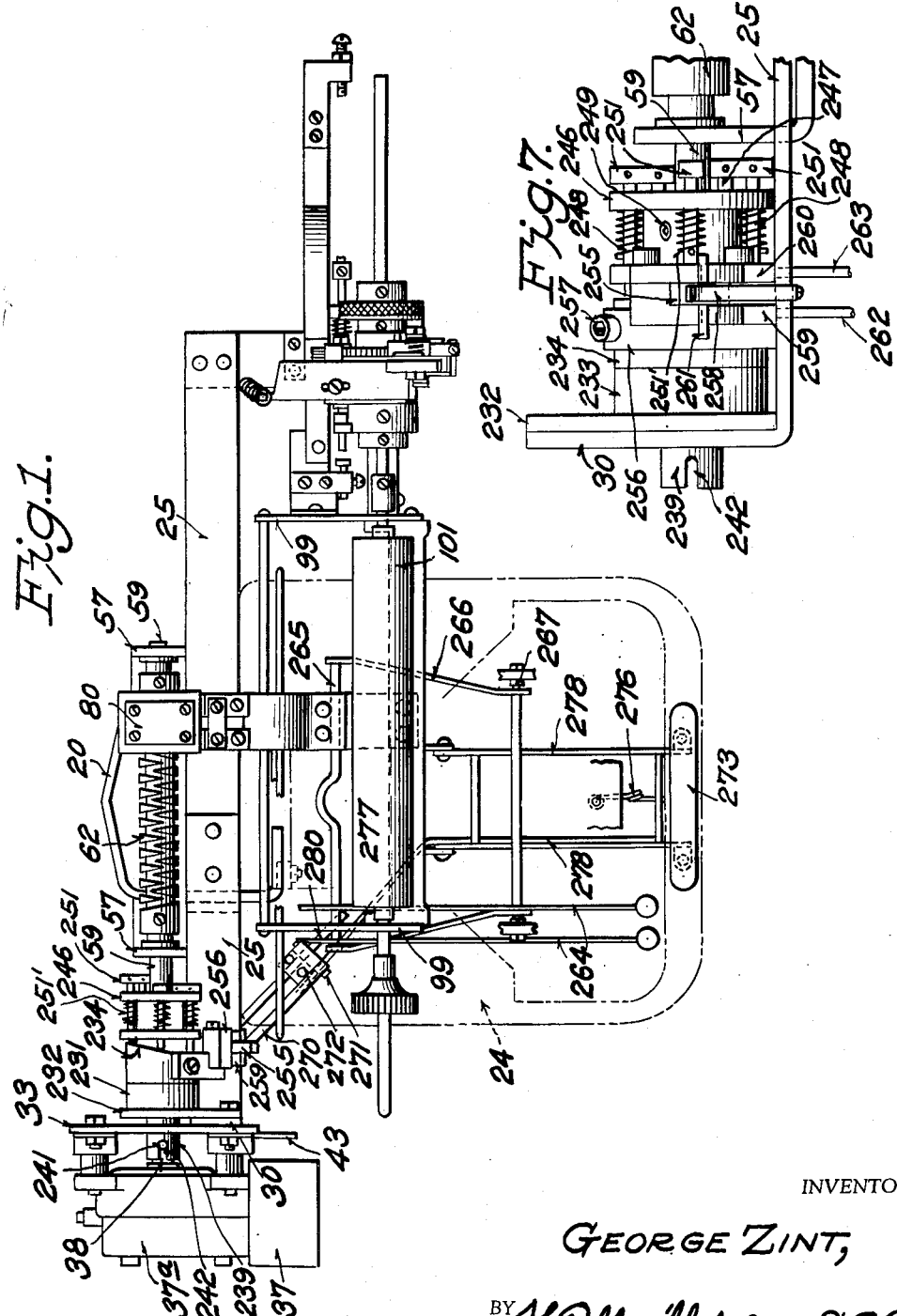
Fig. 1 is a top plan view of a typewriter of the type shown in Patent No. 2,578,711 with the present invention applied thereto, parts of the old typewriter mechanism being omitted and parts being shown in dotted lines.

The illustrated embodiment of the invention has been built on a No. 9 Oliver typewriter made by Oliver Typewriter Company of Chicago, Illinois. As above noted most of the old parts of that typewriter have been omitted and the body frame is shown in broken lines. It has the usual bank of keys and type levers but only two key levers and the space bar are shown in full lines. Many of the new parts of the machine of Patent No. 2,578,771 are shown and will be only briefly referred to since a full disclosure of their construction and operation is found in said patent.

Most of the operative parts of the present invention are supported from a main frame 20 suitably connected to the body frame 24 of the typewriter. Frame 20 carries a main cross bar 25 and brackets 57, the latter mounting a driven shaft 59 on a portion of which is a cross or duplex screw 62. A traveling nut unit 80 is reciprocated on the screw and is suitably connected to the carriage 99 which carries the rotary platen 101. The parts shown at the right of the carriage in Figs. 1 and 2 are fully described in said patent and form no part of the present invention.

At the left end of the bar 25 is an upstanding arm 30 carrying on one side a plate 33 on which is mounted a constant speed electric motor 37 with a speed reduction gear in housing 37ª, and also an electric switch 44 controlled by a push-and-pull finger piece 43 to start and stop the motor. A drive shaft 38 projects from the housing 37ª and is disposed in axial alinement with the driven element, the shaft 59. On the other side of arm 30 is fixed an annular stationary housing 231 concentric with the axis of the shafts; and, as shown in Figs. 4 and 6, it consists of an attaching plate 232 and two cylindrical elements 233 and 234, these parts being fastened together by screws 235. A projecting portion of plate 232 is fastened by screws 236 to arm 30. Slidable and rotatable within the cylindrical bore of the housing 231 is a cylindrical sleeve 237 fixed by a set screw 238 to a short shaft 239 which is a detachable extension of the drive shaft 38. This separable connection of the two sections of the driving element is accomplished by telescoping the end of drive shaft 38 into a socket 240 on the section 239 and providing it with cross pin 241 to enter a transverse notch 242 at the end of the socket. On the outer end of the housing section 234 is an annular cam face having a low portion 243 and a high portion 244, as seen in Fig. 8. On the outer end of the sleeve 237 is at least one longitudinally projecting driving tooth 245 but any number may be used. An annular series of the teeth 245 are shown but only one at a time does the driving as later explained. Any suitable means may be provided to prevent end-wise shifting of the shaft section 239.

Fixed to the reduced end of the driven screw shaft 59 is an annular head 246 carrying an annular series of longitudinally slidable pins 247 to coact with the tooth or teeth 245 and a similar annular series of longitudinally slidable plungers 248 to coact with the stationary cam on the housing section 234, the pins and plungers being arranged in pairs as seen in Fig. 8 for simultaneous sliding movement. The spool-shaped head 246 comprises a cylindrical body portion with a bore into one end of which projects the shaft 59, these parts being fixed to each other by a set screw 249 shown in Fig. 7. The reduced end of the shaft 239 projects into the other end of the bore in the head as seen in Figs. 3 and 4, to provide an additional bearing for that shaft. The cylindrical pins 247 slide in an annular series of holes through the inner portion of the body of the head while the cylindrical plungers 248 slide in an outer annular series of holes in outwardly projecting flanges 250 formed on the ends of the head. The pin and plunger of each pair are fastened together at one end for simultaneous sliding by a radially extending plate or block 251. The other end of each pin is beveled to coact with the teeth 245 which latter are also beveled. The other end of each plunger is rounded to ride on the annular cam on the housing section 234. The plungers and hence the pins are spring projected toward the housing as by means of coil springs 251' which surround the plungers and thrust at one end against one of the flanges 250 and at the other end against cross pins in the plungers. These parts are so proportioned and arranged that unless the plungers are held retracted by other means hereinafter described, the high portion 244 of the stationary cam will hold the plungers retracted with their pins out of the annular path of the continuously rotating driving tooth or teeth 245, but when any plunger passes over the low portion 243 of the cam its spring will project it to move its pin into the path of one of the driving teeth, and the latter will thus move the head 246, and hence the driven screw or element 59, through a portion of a revolution or until the plunger moves onto the high portion of the cam. Thus if a plunger approaching the low portion of the stationary cam is not held retracted at that portion there would be a continuous drive.

To cause a regular or controlled intermittent drive, there is arranged adjacent the low portion of the cam, a radially slidable spring projected control element or gate which may be manually retracted and released to obtain regular spacing or held retracted when long spaces are desired. This control gate is in the form of a substantially rectangular plate 255 slidable in an opening in a bracket or bearing member 256 secured by screws 257 to the housing section 234. The plate or slide 255 extends radially of the axis of the shaft 239 and its inner end may be projected into the path of the plungers 248. Its inward movement is limited by a shoulder as seen in Fig. 5, and while any suitable spring means may be employed for projecting it inwardly, there is shown a leaf spring 258 fastened at one end to bar 25, its free end thrusting against the outer end of the gate or slide. Various means may be employed for retracting the gate from the path of the plungers but I have shown two slidable cams or wedges 259 and 260 which coact with the end portions of a pin 261 extending transversely through and fixed in the gate. These wedge shaped elements are at the upper ends of upright operating rods 262 and 263 which slide in openings in the bar 25. The shouldered lower ends of the cams or wedges 259 and 260 normally rest on the bar 25 with the upper ends of their inclined faces engaged with the pin 261 and their straight faces thrusting against the supporting bracket 256. When either of the wedges is moved upwardly by manipulating its operating rod the gate will be retracted and held retracted until both wedges are lowered.

When the invention is applied to a typewriter, one of the cam wedges is operated when any one of the keys is depressed and the other operated when the space bar is depressed. In Figs. 2 and 3 the numeral 264 denotes two of a bank of key levers, and underlying all of them is the cross portion 265 of a U-shaped member 266, the two arms of which are pivoted at 267 to the typewriter frame. When any key lever is depressed, it depresses the cross bar 265 against the tension of a coil spring 268. These parts are standard and are conventionally illustrated.

Each time the cross bar 265 is depressed, the rod 263 is elevated to cause its cam wedge 260 to retract the gate. That is accomplished by pivoting the lower end of the rod at 269 to the rear end of a lever 270 fulcrumed between its ends on a pin 271 in a bearing bracket 272 fastened to the typewriter frame, the other end of the lever bearing against the under face of the cross bar 265, as seen in Fig. 3.

The space bar 273 is mounted on the front end of the usual frame-like lever 274 pivoted at its rear end at 275 on the typewriter frame and held in an elevated position by a spring 276. To cause the space lever 274 to actuate the rod 262, I provide an angular bar 277 one end 278 of which is fixed to one of the side bars of the lever 274 so that the bar becomes a part of the lever. The free end or arm 279 of the bar 277 is disposed in sliding contact with the underside of a lever 280 the forward end of which is also fulcrumed on the pivot 271, as seen in Fig. 3. The other end of the lever 280 is connected to the lower end of the rod 262 by a pivot 281.

It will be apparent that when the space bar is depressed the wedge 259 will be elevated to retract the gate 255 and that when any key is depressed the other wedge 260 will be elevated to retract the gate. When either the space bar or one of the keys is depressed and immediately released, the parts will return to their normal positions by the action of the springs and gravity, and, the gate will be projected to prevent the projection of the plunger which is then approaching the low portion of the stationary cam so that the driven head will be rotated one space and then stop. If either of the elements is held depressed the driven head will continue to rotate, in the manner above described, until the depressed element is released. It is thus possible to cause any desired length of spaces between letters, words and sentences.

In the illustrated machine the driven head has four of the pins 247 spaced 90° apart and the low portion of the stationary cam extends around one fourth of the circumference of the housing. The cross screw has two threads to the inch and one revolution of it moves the carriage one half of an inch, so that each time a key or the space bar is depressed and released the carriage moves one eighth of an inch. This regular spacing of the letters may be varied according to the size of type used. A larger or smaller number of the pins 248 may be used. If the head has only three pins spaced 120° apart, the low portion of the stationary cam would, of course, extend around one third of the circumference of the housing.

From the foregoing, taken in connection with the accompanying drawing, it will be seen that novel and advantageous provision has been made for carrying out the objects of the invention, and while preferences have been disclosed, attention is invited to the possibility of making variations within the scope of the invention as claimed.

I claim:

1. In a mechanism of the character set forth, a driving shaft and means for continuously rotating it in one direction, a driven shaft axially alined with the driving shaft, a head carried by the driven shaft, an annular series of longitudinally extending pins slidably mounted on said head, a similar series of plungers on said head and operatively connected to the respective pins for simultaneous sliding movement therewith, at least one driving tooth on said driving shaft to coact with any one of said pins, an annular stationary cam surrounding the driving shaft to control the sliding movement of said plungers and pins, spring means urging said plungers and pins in one direction to cause said plungers to ride on said cam, said cam having a low portion permitting one pin at a time to be projected into the path of said driving tooth, and movable means adjacent the low portion of said cam and projectable into the path of sliding movement of at least one of said plungers to hold its pin retracted as such plunger passes the low portion of the cam.

2. The structure of claim 1 in which said movable means is a slidable gate with associated means for projecting and retracting it.

3. The structure of claim 1 in which said movable means comprises a slidable plate, spring means for projecting said plate into the path of sliding movement of the plungers, and manually operated means for retracting said plate.

4. The structure of claim 1 in which said movable means comprises a slidable plate, spring means for projecting said plate into the path of sliding movement of the plungers, and at least one slidable wedge coacting with said plate to retract it against the tension of said spring means.

5. The structure of claim 4 in combination with a typewriter having a reciprocatory platen-carrying carriage operated by said driven shaft, a plurality of key levers and a spring pressed member actuated when any of the key levers is operated, and means actuated by said member for moving said wedge.

6. The structure of claim 4 in combination with a typewriter having a reciprocatory platen-carrying carriage operated by said driven shaft, and a spring pressed space bar lever, and means actuated by said space bar lever for moving said wedge.

7. The structure of claim 1 in which said movable means comprises a slidable plate, spring means for projecting said plate into the path of sliding movement of the plungers, and a pair of independently slidable wedges coacting with said plate to retract it against the tension of said spring means, in combination with a typewriter having a reciprocatory platen-carrying carriage operated by said driven shaft, a plurality of key levers, a spring pressed member actuated when any one of the key levers is operated and a spring pressed space bar lever, an operating rod attached to each of said wedges, a lever fulcrumed between its ends and having one end pivotally connected to one of said wedge rods, the other end of the last mentioned lever being actuated by said member when one of the key levers is operated, a second lever fulcrumed at one end and having its other end pivotally connected to the other of said wedge rods, and an arm fixed to said space bar lever to actuate said second lever.

References Cited in the file of this patent

UNITED STATES PATENTS

| | | |
|---|---|---|
| 701,088 | Ray | May 27, 1902 |
| 2,411,723 | Hausman | Nov. 26, 1946 |